UNITED STATES PATENT OFFICE.

GEORGE E. MITCHELL, OF LOWELL, MASSACHUSETTS.

IMPROVEMENT IN MEDICATED PLASTERS.

Specification forming part of Letters Patent No. 118,872, dated September 12, 1871.

*To all whom it may concern:*

Be it known that I, GEORGE E. MITCHELL, of Lowell, Massachusetts, have invented a certain Medicated Plaster, of which the following is a specification:

My invention relates to an improved medicated plaster to be used to relieve pain; and consists in a composition formed of rubber, Burgundy pitch, and extract or leaves of belladonna or opium, which is spread on cloth or other suitable material to form a plaster. The rubber and pitch, when compounded together, causes the plaster to remain at all times elastic and pliable, and always ready for use without the application of heat, as the plaster, after being applied, will adhere firmly from the heat of the body; and, when removed, no portion of the rubber or pitch will adhere to the skin.

To prepare the plaster I take two ounces of Burgundy pitch, one ounce extract or the leaves of belladonna; heat them in a suitable vessel, and stir them until they are thoroughly mixed. Then I take six ounces pure rubber, cut it in suitable-sized pieces, and put it in a vessel; then add spirits of turpentine until the rubber is of the right consistence to strain. After straining, add to this the belladonna and Burgundy pitch; compound and heat them all together in a suitable vessel until thoroughly mixed and of the right consistency, in which condition it is spread upon cloth or other suitable material by means of calenders, in a manner too well known to need further description. In using the leaves of belladonna instead of extract, they must be dried and ground together with the rubber. In using opium in place of the extract or leaves of belladonna, one ounce of the extract would be required to make the above quantity of the compound.

Some circumstances may require a slight variation of the proportions of the ingredients. Such variations would not change the principle and purpose of my invention.

The chief advantages of my invention are as follows: It will not dry up nor crack off in the coldest weather, nor become soft or sticky in the hottest weather, as is the case when Burgundy pitch alone is used as an adhesive agent. It can be applied without heating, as the heat of the body will always cause it to adhere firmly.

A plaster compounded of the above ingredients is superior to any plaster before known or used.

I claim—

The plaster herein described, when made and coated with the compound of the ingredients, in the proportions and for the purposes set forth.

GEO. E. MITCHELL.

Witnesses:
ABEL WHITNEY,
C. H. LEIGHTON.

(29.)